United States Patent [19]

Okamoto et al.

[11] Patent Number: 5,434,676
[45] Date of Patent: Jul. 18, 1995

[54] APPARATUS FOR MIXING VIDEO SIGNALS HAVING DIFFERENT NUMBERS OF LINES

[75] Inventors: Manabu Okamoto; Takashi Yoshimi; Hiroyasu Matsuura; Noriyoshi Takeya; Hitoshi Yamazaki; Masakazu Miyazaki; Hirofumi Matoba, all of Tokorozawa, Japan

[73] Assignee: Pioneer Electronic Corporation, Tokyo, Japan

[21] Appl. No.: 168,215

[22] Filed: Dec. 17, 1993

[30] Foreign Application Priority Data

Dec. 17, 1992 [JP] Japan ............... 4-337458

[51] Int. Cl.6 ............................................. H04N 5/76
[52] U.S. Cl. .................................... 358/335; 360/13;
360/32; 360/37.1; 348/565; 348/584; 348/589;
348/600
[58] Field of Search ............... 358/335, 339, 342, 310,
358/322, 311, 319; 360/33.1, 36.1, 36.2, 32, 13,
14.1, 37.1; 348/565, 571, 584, 586, 589, 600,
598; H04N 5/76

[56] References Cited

U.S. PATENT DOCUMENTS

| | | | |
|---|---|---|---|
| 4,580,165 | 4/1986 | Patton et al. | 348/589 |
| 4,835,623 | 5/1989 | Okano et al. | 358/339 |
| 5,051,817 | 9/1991 | Takano | 348/600 |
| 5,097,348 | 3/1992 | Suetaka | 358/335 |
| 5,130,966 | 7/1992 | Yoshio et al. | 358/335 |
| 5,155,595 | 10/1992 | Robinson | 348/565 |
| 5,227,862 | 7/1993 | Choi | 348/600 |

FOREIGN PATENT DOCUMENTS 1256071 12/1989 Japan .

Primary Examiner—Tommy P. Chin
Assistant Examiner—Khoi Troung
Attorney, Agent, or Firm—Sughrue, Mion, Zinn, Macpeak & Seas

[57] ABSTRACT

A video signal mixing apparatus for mixing a playback composite video signal produced by playing a recording medium and a graphics composite video signal generated on the basis of video data read from a memory device, wherein a vertical synchronizing signal of the playback composite video signal is forcedly generated in response to a vertical synchronizing signal of the graphics composite video signal to make the number of horizontal scanning lines of the playback composite video signal coincident with the number of horizontal scanning lines of the graphics composite video signal.

2 Claims, 1 Drawing Sheet

APPARATUS FOR MIXING VIDEO SIGNALS HAVING DIFFERENT NUMBERS OF LINES

BACKGROUND OF THE INVENTION

1. Field of the Invention

The present invention relates generally to image processing, and more particularly to an apparatus for mixing a playback composite video signal produced by playing a recording medium such as a video disk and a graphics composite video signal produced on the basis of image data read from a memory device.

2. Description of the Related Background Art

Japanese Patent Kokai No. 1-256071 (1989), for example, discloses an apparatus for mixing a playback composite video signal indicative of a moving picture or a still picture produced by playing a recording medium such as a video disk and a graphics composite video signal indicative of a graphics image based on graphics data derived as sub-code signals. In the apparatus, the playback composite video signal and graphics composite video signal are respectively passed through variable resistors and added to each other, wherein the resistance value of each variable resistor is changed in accordance with a manual operation, thus arbitrarily determining a mixing ratio of the playback composite video signal and the graphics composite video signal.

Incidentally, the playback composite video signal conforms to the NTSC standard signals used in the normal television broadcasting, where the horizontal scanning frequency is 15.734 KHz and the number of horizontal scanning lines per frame is 525. On the other hand, while the graphics composite video signal has the same horizontal scanning frequency as the play video signal, the number of scanning lines per frame, determined therefor, is 524 or 526. Since the numbers of the horizontal scanning lines are different by one between the playback composite video signal and the graphics composite video signal, they cannot be vertically synchronized to each other, thereby causing a phenomenon that an image runs on the screen and presenting difficulties in viewing such an image.

SUMMARY OF THE INVENTION

It is therefore an object of the present invention to provide an video signal mixing apparatus which is capable of satisfactorily mixing a playback composite video signal and a graphics composite video signal, which have different numbers of scanning lines from each other, without causing the respective images produced by these signals to run on the screen.

A video signal mixing apparatus according to present invention comprises means for converting a playback composite video signal produced by playing a recording medium to a digital video signal; first synchronizing signal generating means for generating first horizontal and first vertical synchronizing signals having predetermined horizontal and vertical scan frequencies of the playback composite video signal on the basis of a predetermined reference clock signal; memory control means for writing the digital video signal into a video memory having a capacity of storing at least a one-field portion of video signal and for reading a digital video signal from the video memory in synchronism with the first horizontal and first vertical synchronizing signals; means for converting the read digital video signal by the memory control means to an analog video signal; first mixing means for adding the first horizontal and first vertical synchronizing signals to the analog video signal to generate a playback composite video signal; second synchronizing signal generating means for generating a second horizontal synchronizing signal having the same frequency as that of the first horizontal synchronizing signal and a second vertical synchronizing signal having a frequency different from that of the first vertical synchronizing signal; means for reading video data from a memory device and generating a graphics video signal indicative of a graphic image; second mixing means for adding the second horizontal and second vertical synchronizing signals to the graphics video signal to generate a graphics composite video signal; and third mixing means for mixing the playback composite video signal output from the first mixing means and the graphics composite video signal, and is characterized in that the first synchronizing signal generating means generates the first vertical synchronizing signal in response to the second vertical synchronizing signal.

In the video signal mixing apparatus of the present invention, when the first vertical synchronizing signal, which should be the vertical synchronizing signal of the playback composite video signal is forcedly generated in response to the second vertical synchronizing signal which is the vertical synchronizing signal of the graphics composite video signal, a read position in a video memory is moved to a predetermined initial position in response to the first vertical synchronizing signal, from which video data is read out, whereby the number of horizontal scanning lines of the playback composite video signal is made coincident with the number of horizontal scanning lines of the graphics composite video signal.

DETAILED DESCRIPTION OF THE PREFERRED EMBODIMENT

Figure 1:
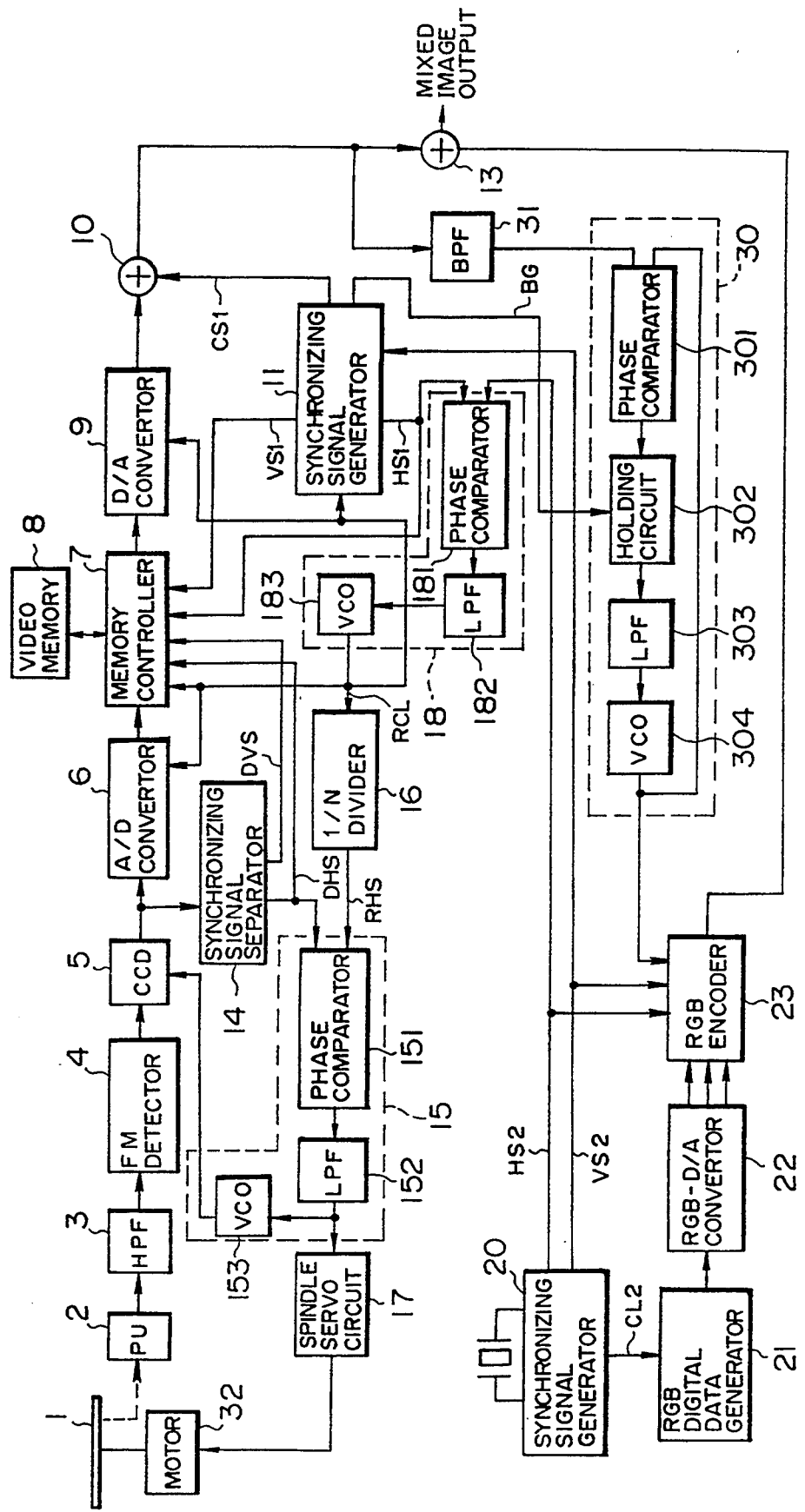
FIG. 1 is a block diagram showing an embodiment of the present invention.

An embodiment of the present invention will hereinafter be described in detail with reference to the accompanying drawings.

In an apparatus according to the present invention shown in FIG. 1, a signal recorded on a video disk 1 is read by a pickup 2. A read RF signal issued from the pickup 2 is filtered by a HPF (high pass filter) 3 such that video signal band components alone pass therethrough and are supplied to an FM detector 4. A video signal demodulated in the FM detector 4 is supplied to a CCD (charge coupled device) 5. The CCD 5 is provided for controlling the phase of the demodulated video signal so as to offset time base errors. A video signal generated from the CCD 5 is converted to digital video data by an A/D (analog-to-digital) convertor 6 and then supplied to a memory controller 7. The memory controller 7 controls to write data into and read data from a video memory 8. The video memory 8 comprises a FIFO (first-in first-out) type of memory having the capacity of storing at least a one-field portion of a video signal. Video data read from the video memory 8 is supplied to a D/A (digital-to-analog) convertor 9 through the memory controller 7. The D/A convertor 9 converts the read data to an analog video signal.

A mixer 10 is connected to the output of the D/A convertor 9. The mixer 10 is provided for adding a first composite synchronizing signal CS1 to an analog video signal from the D/A convertor 9. The first composite synchronizing signal CS1 is generated by a synchronizing signal generator circuit 11. An output signal from the mixer 10 is supplied to another mixer 13 and a BPS (band pass filter) 31 which is a filter having the central frequency at 3.58 MHz.

A synchronizing signal separator 14 is connected to the output of the D/A convertor 9. The synchronizing signal separator 14 separates and extracts from a demodulated video signal a horizontal synchronizing signal DHS and a vertical synchronizing signal DVS. The horizontal synchronizing signal DHS and the vertical synchronizing signal DVS thus separated and extracted are supplied to the memory controller 7. The horizontal synchronizing signal DHS is also supplied to a PLL (phase locked loop) circuit 15 which is composed of a phase comparator 151, a LPF (low pass filter) 152 and a VCO (voltage controlled oscillator) 153. The phase comparator 151 compares a reference horizontal synchronizing signal RHS generated by a 1/N divider 16 (N is 910, for example) with the separated horizontal synchronizing signal DHS in phase and supplies the comparison result to the LPF 152. An output signal of the LPF 152 is supplied to a spindle servo circuit 17 as a time base error signal besides it serves as a control voltage for the VCO 153. The spindle servo circuit 17 controls the rotation of a spindle motor 32 so as to offset the time base error signal.

The synchronizing signal generator 11 comprises a counter, not shown, for counting a reference clock signal RCL generated from a PLL circuit 18 in order to generate first horizontal, first vertical and first composite synchronizing signals HS1, VS1, CS1, respectively, comforming to the video signal format of the NTSC standard, as well as generate a burst gate signal BG indicative of a color burst signal generating period. The first horizontal and vertical synchronizing signals HS1, VS1 are supplied to the memory controller 7, while the first composite synchronizing signal CS1 is supplied to the mixer 10.

The PLL circuit 18 is composed of a phase comparator 181, a LPF 182 and a VCO 183. The phase comparator 181 compares in phase the first horizontal synchronizing signal HS1 output from the synchronizing signal generator 11 with a second horizontal synchronizing signal HS2 output from a synchronizing signal generator 20 for graphics, and supplies the comparison result to the LPF 182. An output signal of the LPF 182 serves as a control voltage for the VCO 183. An oscillating signal generated from the VCO 183, having an oscillating frequency at 4 fsc, is supplied to the A/D convertor 6, memory controller 7, D/A convertor 9 and 1/N divider 16 as the reference clock signal RCL. The A/D convertor 6, memory controller 7 and D/A convertor 9 operate with the reference clock signal RCL as a timing signal.

The synchronizing signal generator 20 generates synchronizing signals for graphics video signals, i.e., a second vertical synchronizing signal VS2 and a second clock signal CL2 in addition to the foregoing horizontal synchronizing signal HS2. For the graphics video signal, the frequency of the second horizontal synchronizing signal HS2 is equal to the horizontal synchronizing frequency of the NTSC standard video signals, whereas the frequency of the second vertical synchronizing signal VS2 is different from the vertical synchronizing frequency of the NTSC standard video signals because the number of horizontal scanning lines of the graphics video signal is 524 or 526 per frame. The second vertical synchronizing signal VS2 generated from the synchronizing signal generator 20 is supplied to the synchronizing signal generator 11 which generates the first synchronizing signal HS1 each time the counter arranged therein counts the reference clock signal RCL predetermined times (for example, 910). The counter is reset when the second vertical synchronizing signal VS2 is supplied to the synchronizing signal generator 11.

The second clock signal CL2 generated from the synchronizing signal generator 20 is supplied to an RGB digital data generator 21 which, in synchronism with the second clock signal CL2, reads RGB data indicative of the tone of a graphics image stored in an internal memory and outputs by the one-pixel portion thereof at a time. The data read is performed in accordance with a predetermined program. An RGB-D/A convertor 22 is connected to the output of the RGB digital data generator 21 for converting the RGB data to an analog RGB signal. The analog RGB signal output from the RGB-D/A convertor 22 is supplied to an RGB encoder 23 separately for R, G and B components. The RGB encoder 23 is further supplied with the second horizontal synchronizing signal HS2 and the second vertical synchronizing signal VS2, and converts the analog RGB signal into a composite video signal in response to the second horizontal synchronizing signal HS2, second vertical synchronizing signal VS2 and a signal from a PLL circuit 30. The converted video signal is supplied to the mixer 13 as a graphics composite video signal. The mixer 13 is provided for superimposing an image represented by the graphics composite video signal on an image represented by a composite video signal from the mixer 10.

The PLL circuit 30 is composed of a phase comparator 301, a holding circuit 302, a LPF 303 and a VCO 304. The phase comparator 301 compares a color burst signal issued from the BPF 31 with an oscillating signal generated from the VCO 304 in phase, and supplies the comparison result to the holding circuit 302. The holding circuit 302 supplies the output signal from the phase comparator 301 as it is to the LPF 303 when a burst gate signal BG at high level is being supplied thereto, and holds therein the output signal of the phase comparator 301 immediately before the burst gate signal BG becomes low and supplies the held signal to the LPF 303 when the burst gate signal BG at low level is being supplied thereto. An output voltage of the LPF 303 serves as a control voltage for the VCO 304. An oscillating signal generated by the VCO 304, which has an oscillating frequency at 3.58 MHz and maintains the phase continuity, is supplied to the RGB encoder 23.

In the foregoing structure, a read RF signal output from the pickup 2 is filtered in the HPF 3 such that video signal band components alone pass therethrough and are supplied to the FM detector 4. A video signal demodulated by the FM detector 4 has its jitter components which are removed by the CCD 5 in accordance with an oscillating signal of the PLL circuit 15, and then is supplied to the A/D convertor 6 and the synchronizing signal separator 14. Video data, which is a digital video signal output from the A/D convertor 6, is supplied to the memory controller 7. The memory controller 7 sequentially designates write addresses in the video memory 8 in response to the horizontal synchronizing signal DHS and the vertical synchronizing signal DVS separated in the synchronizing signal separator 14 as well as the reference clock signal RCL from the VCO 183, and writes the video data into storing portions at the write addresses. Thus, video data of, for example, 910 pixels per 1H (horizontal scanning period) are written into the video memory 8. Also in the video memory 8, read addresses are sequentially specified by the memory controller 7 in response to the first horizontal synchronizing signal HS1 and the first vertical synchronizing signal VS1 as well as the reference clock signal RCL from the VCO 183, and a one-pixel portion of video data is read from each of those address. The read video data is converted to an analog video signal by the D/A convertor 9. The analog video signal is mixed in the mixer 10 with a first composite synchronizing signal CS1 conforming to the video signal format of the NTSC standard from the synchronizing signal generator 11 to produce a playback composite video signal derived by playing a disk. The composite video signal is supplied to the mixer 13.

On the other hand, RGB data indicative of the tone of a graphics image generated from the RGB digital data generator 21 is converted to an analog RGB signal in the RGB-D/A convertor 22 and then supplied to the RGB encoder 23 separately for R, G and B components. The RGB encoder 23 converts the analog RGB signal to a graphics composite video signal in response to the second horizontal synchronizing signal HS2, the second vertical synchronizing signal VS2 and an oscillating signal at 3.58 MHz which serves as a reference signal for generating color signals of the graphics composite video signal.

The graphics composite video signal is mixed with the playback composite video signal in the mixer 13 and output to a CRT display (not shown).

The second vertical synchronizing signal VS2 generated from the synchronizing signal generator 20 is supplied to the synchronizing signal generator 11 as a reset signal. When the synchronizing signal generator 11 is supplied with the second vertical synchronizing signal VS2, the counter for counting the reference clock signal RCL is reset by the leading edge thereof. Since the counter is set in an initial state, the first vertical synchronizing signal VS1 is forcedly generated substantially in synchronism with the generation of the second vertical synchronizing signal VS2. Thus, the memory controller 7 changes the read address to a predetermined base address in response to the first vertical synchronizing signal VS1 thus generated, and reads a one-pixel portion of video data from that address. The predetermined base address is an address corresponding to the first address at the upper left corner on the screen. In the subsequent one field, read addresses are sequentially specified in response to the first horizontal synchronizing signal HS1 and the reference clock signal RCL. Read video data is converted to an analog video signal by the D/A convertor 9, and then mixed with the first composite synchronizing signal CS1 including the first vertical synchronizing signal VS1 in the mixer 10. Next, in the mixer 13, the playback composite video signal and the graphics composite video signal are mixed in synchronism with each other. The counter, immediately after being reset, begins counting the reference clock signal RCL from the initial value.

It will be understood that while the above described embodiment has been explained in conjunction with a video disk as a recording medium, the present invention may be applied to playing other recording media such as a tape on which video signals are recorded, and so on.

Also, while the above described embodiment illustrates an example in which RGB data indicative of the tone of a graphics image is generated from the RGB digital data generator 21 having an internal memory, such RGB data may be read out under the control of a program recorded on the video disk 1 used as a means for storing RGB data.

As can be appreciated from the foregoing, in the video signal mixing apparatus according to the present invention, when the first vertical synchronizing signal, which should be the vertical synchronizing signal of a playback composite video signal, is forcedly generated in response to the second vertical synchronizing signal which is the vertical synchronizing signal of a graphics composite video signal, a read position in a video memory changes to a predetermined initial position in response to the first vertical synchronizing signal, from which video data is read out. Since the number of horizontal scanning lines of the playback composite video signal is made coincident with the number of horizontal scanning lines of the graphics composite video signal, they can be satisfactorily mixed without causing a play video image and a graphics image to run on the screen.

What is claimed is:

1. A video signal mixing apparatus comprising:
   means for converting a playback composite video signal produced by playing a recording medium to a digital video signal;
   first synchronizing signal generating means for generating first horizontal and first vertical synchronizing signals having horizontal and vertical scanning frequencies corresponding to said playback composite video signal and based on a reference clock signal;
   memory control means for writing said digital video signal into a video memory having a capacity of storing at least a one-field portion of the video signal and for reading a digital video signal from said video memory in synchronism with said first horizontal and first vertical synchronizing signals;
   means for converting the read digital video signal by said memory control means to an analog video signal;
   first mixing means for adding said first horizontal and first vertical synchronizing signals to said analog video signal to generate a playback composite video signal;
   second synchronizing signal generating means for generating a second horizontal synchronizing signal having a predetermined frequency corresponding to that of said first horizontal synchronizing signal and a second vertical synchronizing signal having a frequency different from that of said first vertical synchronizing signal;
   means for reading video data from a memory device and generating a graphics video signal indicative of a graphic image;
   second mixing means for adding said second horizontal and second vertical synchronizing signals to said graphics video signal to generate a graphics composite video signal; and
   third mixing means for mixing said playback composite video signal output from said first mixing means and said graphics composite video signal,
   wherein said first synchronizing signal generating means generates said first vertical synchronizing signal in response to said second vertical synchronizing signal.

2. A video signal mixing apparatus according to claim 1, wherein said first synchronizing signal generating means includes a counter for counting said reference clock signal, said counter generating said first horizontal synchronizing signal every time it counts a predetermined number of said predetermined reference clock signal, and being reset in response to said second vertical synchronizing signal to generate said first vertical synchronizing signal.

* * * * *